United States Patent
Suzuki et al.

(10) Patent No.: US 9,254,762 B2
(45) Date of Patent: Feb. 9, 2016

(54) SEAT STRUCTURE FOR VEHICLE

(71) Applicant: MAZDA MOTOR CORPORATION, Hiroshima (JP)

(72) Inventors: Takashi Suzuki, Hiroshima (JP); Kouichi Nakaya, Aki-gun (JP); Shin Sakai, Hiroshima (JP); Katsunori Monden, Higashihiroshima (JP); Tsutomu Maruyama, Kure (JP); Hirotaka Matsumura, Hiroshima (JP); Yoshitaka Tanaka, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/192,618

(22) Filed: Feb. 27, 2014

(65) Prior Publication Data
US 2014/0265470 A1 Sep. 18, 2014

(30) Foreign Application Priority Data

Mar. 14, 2013 (JP) ................................. 2013-051831

(51) Int. Cl.
*B60N 2/42* (2006.01)
*B60N 2/50* (2006.01)
*B60N 2/16* (2006.01)

(52) U.S. Cl.
CPC ............ *B60N 2/4228* (2013.01); *B60N 2/1615* (2013.01); *B60N 2/43* (2013.01); *B60N 2/165* (2013.01); *B60N 2/508* (2013.01)

(58) Field of Classification Search
CPC ......... B60N 2/1615; B60N 2/42; B60N 2/508
USPC ............... 297/216.1, 216.15, 216.16, 216.18, 297/216.19, 344.11, 344.15, 344.16, 344.17
See application file for complete search history.

(56) References Cited

U.S. PATENT DOCUMENTS

| | | | | |
|---|---|---|---|---|
| 6,957,796 | B2 * | 10/2005 | Hensley ................... | B60N 2/06 248/421 |
| 8,146,991 | B2 * | 4/2012 | Stanz .................... | B60N 2/0232 297/344.13 |
| 2002/0047296 | A1 * | 4/2002 | Houston ................. | B60R 22/26 297/216.1 |
| 2005/0006937 | A1 * | 1/2005 | Takata ................. | B60N 2/1615 297/344.15 |
| 2006/0152048 | A1 | 7/2006 | Kamei et al. | |
| 2007/0246919 | A1 * | 10/2007 | Kai ........................... | 280/730.1 |

FOREIGN PATENT DOCUMENTS

| | | |
|---|---|---|
| JP | 2006-192986 A | 7/2006 |
| JP | 2012-148721 A | 8/2012 |

* cited by examiner

*Primary Examiner* — Syed A Islam
(74) *Attorney, Agent, or Firm* — Studebaker & Brackett PC

(57) ABSTRACT

A seat structure for a vehicle of the present invention comprises a seat cushion frame, slide mechanisms including a pair of guide rails provided at a vehicle floor and a pair of sliders, a pair of connecting members connecting the pair of sliders and the seat cushion frame, a connection position of the connecting members and the seat cushion frame being located inward in a seat width direction relative to a connection position of the connecting members and the sliders, and a coupling member coupling the pair of connecting members in a vehicle width direction so as to restrain the pair of connecting members from moving inward in the seat width direction in a rear-end collision of the vehicle.

10 Claims, 10 Drawing Sheets

SEAT STRUCTURE FOR VEHICLE

BACKGROUND OF THE INVENTION

The present invention relates to a seat structure for a vehicle, and particularly to a seat structure for a vehicle which comprises a seat cushion, a seatback, and a headrest.

It is required for a seat of a vehicle to ensure the safety of a passenger in a rear-end collision of the vehicle, in addition to the performance of the seat itself, such as the function of holding a passenger's position and the comfortableness. The rear-end collision of the vehicle occurs when the vehicle is hit from behind by another vehicle or the vehicle moving backward hits against an obstacle or something. In the rear-end collision of the vehicle, a load acts on the seat from the rear, so that a passenger is pressed against a seatback and a headrest. In this case, it is necessary to control such that the position of a passenger's head portion does not improperly change relative to the headrest in order to prevent whipping of the passenger properly.

More specifically, in the vehicle rear-end collision, a rearward load operative to cause a rearward move of the seat relative to a vehicle body due to the force of inertia acts on the seatback mainly. Consequently, another load operative to push down a rear portion of the seat cushion in which the passenger is seated occurs, too. When the rear portion of the seat cushion lowers, there is a concern that the position, in a vertical direction, of the head portion of the passenger relative to the headrest may change improperly.

In general, the seat cushion of the seat includes a frame member, such as a seat cushion frame, and this frame member is connected to and supported at a pair of slide mechanisms (a guide rail and a slider, primarily) which are provided at right and left both-side portions of the seat fixed onto a vehicle floor via a bracket for seat fixing or a lifter mechanism. That is, between the side mechanisms and the seat cushion are provided a pair of right-and-left connecting members which connect the side mechanisms and the seat cushion and support the seat.

Japanese Patent Laid-Open Publication No. 2012-148721, which shows the above-described fixation structure (support structure), discloses a seat structure in which a lifter mechanism is provided between a floor of a vehicle body and a seat cushion. According to the seat structure disclosed in the above-described patent document, the distance, in a vertical direction, between the floor and the seat cushion is so long because of providing the lifter mechanism that the amount of lowering of the rear end of the seat cushion tends to increase. Therefore, the seat structure of the patent document is configured such that a rear link of the lifter mechanism comes to contact a stopper in the rear-end collision, thereby restraining the amount of lowering of the rear end of the seat cushion.

Herein, the inventors of the present invention and others have considered a seat structure in which at both sides or one side of the pair of right-and-left connecting members, a connection position of the lifter mechanism and the seat cushion frame is located inward in a seat width direction relative to a connection position of the lifter mechanism and the slide mechanism in order to provide a properly small-sized lift mechanism for the light-weight achievement. However, in this seat structure, when the rear-end collision of the vehicle occurs, the lift mechanism tends to fall down toward the inside of a pair of slide rails (i.e., move inward in a seat width direction) due to the above-described load acting on the seat. Herein, there is problem in that in a case in which the above-described situation happens, the rear link and the stopper of the above-described patent document may not properly restrain the rear end portion of the seat from lowering.

Herein, in a case in which at both sides of a pair of right-and-left lift mechanisms, the connection positions of the lifter mechanisms and the seat cushion frame are located inward in the seat width direction relative to the connection positions of the lifter mechanisms and the slide mechanism, the passenger also lowers as an entire part of the rear portion of the seat cushion lowers, so that there is a problem in that the position of the passenger's head may change vertically relative to the headrest. Meanwhile, in a case in which at one side of the pair of right-and-left lift mechanisms, the connection position of the lifter mechanism and the seat cushion frame is located inward in the seat width direction relative to the connection position of the lifter mechanism and the slide mechanism, the passenger also slants as only the one side of the rear portion of the seat cushion lowers mainly, so that there is another problem in that the position of the passenger's head may change vertically and laterally relative to the headrest.

Further, the above-described problems happen not only to the seat equipped with the above-described lift mechanism(s) but also to a seat structure designed for different types of vehicle for commonality in which the width of a seat itself is set to be relatively short for a particular type of vehicle and a connection position of a bracket for seat fixation and a seat cushion frame is located inward in the seat width direction relative to a connection position of the bracket for seat fixation and a slide mechanism.

SUMMARY OF THE INVENTION

The present invention has been devised to solve the above-described problems of the prior art, and an object of the present invention is to provide a seat structure for a vehicle which can restrain the lowering of the seat rear portion so as to properly keep the position of the passenger's head relative to the headrest.

According to the present invention, there is provided a seat structure for a vehicle which comprises a seat cushion, a seatback, and a headrest, comprising a seat cushion frame provided inside the seat cushion, a pair of right-and-left slide mechanisms provided at right and left both-side portions of the seat cushion in a plan view so as to support the seat cushion frame slidably in a seat longitudinal direction, the slide mechanisms including a pair of guide rails provided at a floor of the vehicle and a pair of sliders provided to engage with and slide along the pair of guide rails, a pair of right-and-left connecting members connecting the pair of sliders of the slide mechanisms and the seat cushion frame so as to support the seat cushion frame, a connection position of at least one of the pair of connecting members and the seat cushion frame being located inward in a seat width direction relative to a connection position of the at least one of the pair of connecting members and at least one of the pair of sliders, and a coupling member coupling the pair of connecting members in a vehicle width direction so as to restrain the at least one of the pair of connecting members from moving inward in the seat width direction in a rear-end collision of the vehicle.

According to the present invention, the connecting members can be restrained from falling down toward the inside of the pair of slide mechanisms in the vehicle rear-end collision, whereby the lowering of the rear portion of the seat, on which the relatively large load acts, can be restrained. Thereby, the vertical and lateral position of the passenger's head relative to the headrest can be kept properly.

According to an embodiment of the present invention, the pair of connecting members have a pair of faces which extend in a direction perpendicular to a vehicle longitudinal direction, and the coupling member is fixed to the pair of faces of the connecting members so as to couple the pair of connecting members in the vehicle width direction. Thereby, the inward falling down of the connecting members in the vehicle width direction can be restrained effectively.

According to another embodiment of the present invention, the coupling member has a pair of faces which extend in the direction perpendicular to the vehicle longitudinal direction, and the pair of faces of the coupling member are fixed to the pair of faces of the connecting members, respectively, whereby the coupling member couples the pair of connecting members in the vehicle width direction. Thereby, since the fixation direction of the faces of the coupling member and the faces of the connecting members is perpendicular to the inward-falling-down direction of the connecting members, the inward falling down of the connecting members can be restrained effectively.

According to another embodiment of the present invention, the coupling member, which has a specified length in the seat longitudinal direction and extends in a vehicle width direction, is a plate member which couples the pair of sliders of the slide mechanisms, a front edge portion or a rear edge portion of the plate member is configured to bend upward, and the edge portion configured to bend upward is fixed to the pair of connecting members. Thereby, the inward falling down of the connecting members can be restrained with a simple structure, ensuring the positing of the slide of the seat which is achieved by synchronizing of the slide of the pair of sliders.

According to another embodiment of the present invention, the pair of connecting members include a pair of link members capable of having the seat cushion frame move vertically, and the seat structure further comprises a drive unit provided at either one of right and left sides of the seat to drive one of the pair of link members so as to have the seat cushion frame move vertically and a stabilizer interconnecting the pair of link members so as to drive the other of the link members synchronously with the one of the link members which is driven by the drive unit, positions where both end portions of the stabilizer are fixed to the pair of link members being located inward in the seat width direction relative to the connection positions of the pair of connecting members and the pair of sliders. Thereby, since the seat structure further comprises the drive unit provided at either one of right and left sides of the seat and drives one of the pair of link members so as to have the seat cushion frame move vertically and the stabilizer interconnecting the pair of link members so as to drive the other of the link members synchronously with the one of the link members driven by the drive unit, the number of parts can be reduced by providing the drive unit only for one of the pair of link members. Further, since the positions where both end portions of the stabilizer are fixed to the pair of link members are located inward in the seat width direction relative to the connection positions of the pair of connecting members and the pair of sliders, the length of the stabilizer can be properly short because of the above-described inward-offset location, thereby achieving light weight. Moreover, since the both end portions of the stabilizer are fixed to the pair of link members, the inward falling down of the link members (the connecting members) in the vehicle rear-end collision can be restrained surely, in addition to the restraint function of the inward falling down of the connecting members which is achieved by the coupling member Other features, aspects, and advantages of the present invention will become apparent from the following description which refers to the accompanying drawings.

BRIEF DESCRIPTION OF THE DRAWINGS

FIG. 10A is a plan view; FIG. 10B is a back view; and FIG. 10C is a side view.

DETAILED DESCRIPTION OF THE INVENTION

Figure 1:
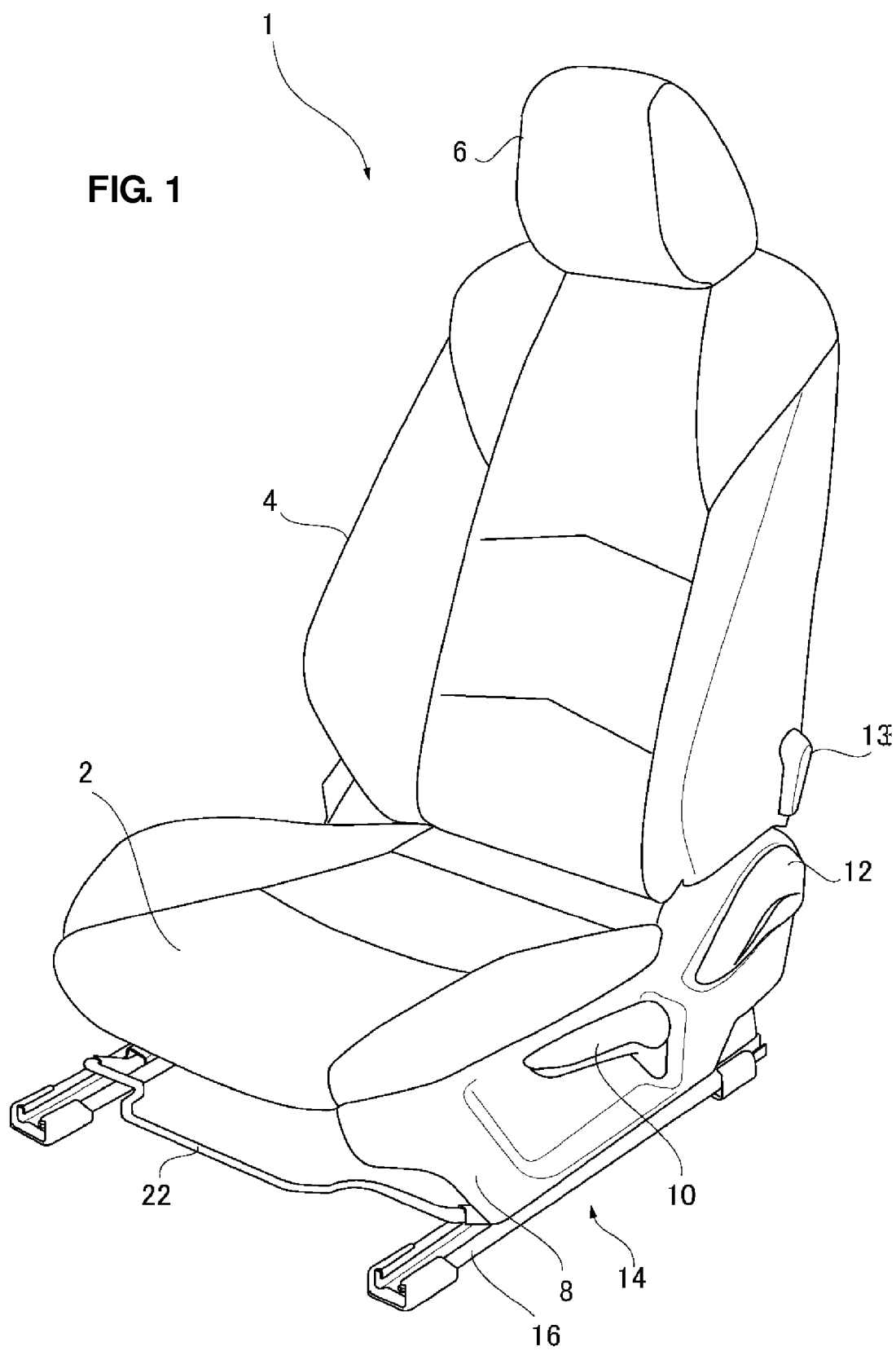
FIG. 1 is a perspective view of a seat structure for a vehicle according to an embodiment of the present invention, when viewed obliquely from a vehicle front-and-left oblique side and a vehicle upper side.
Figure 2:
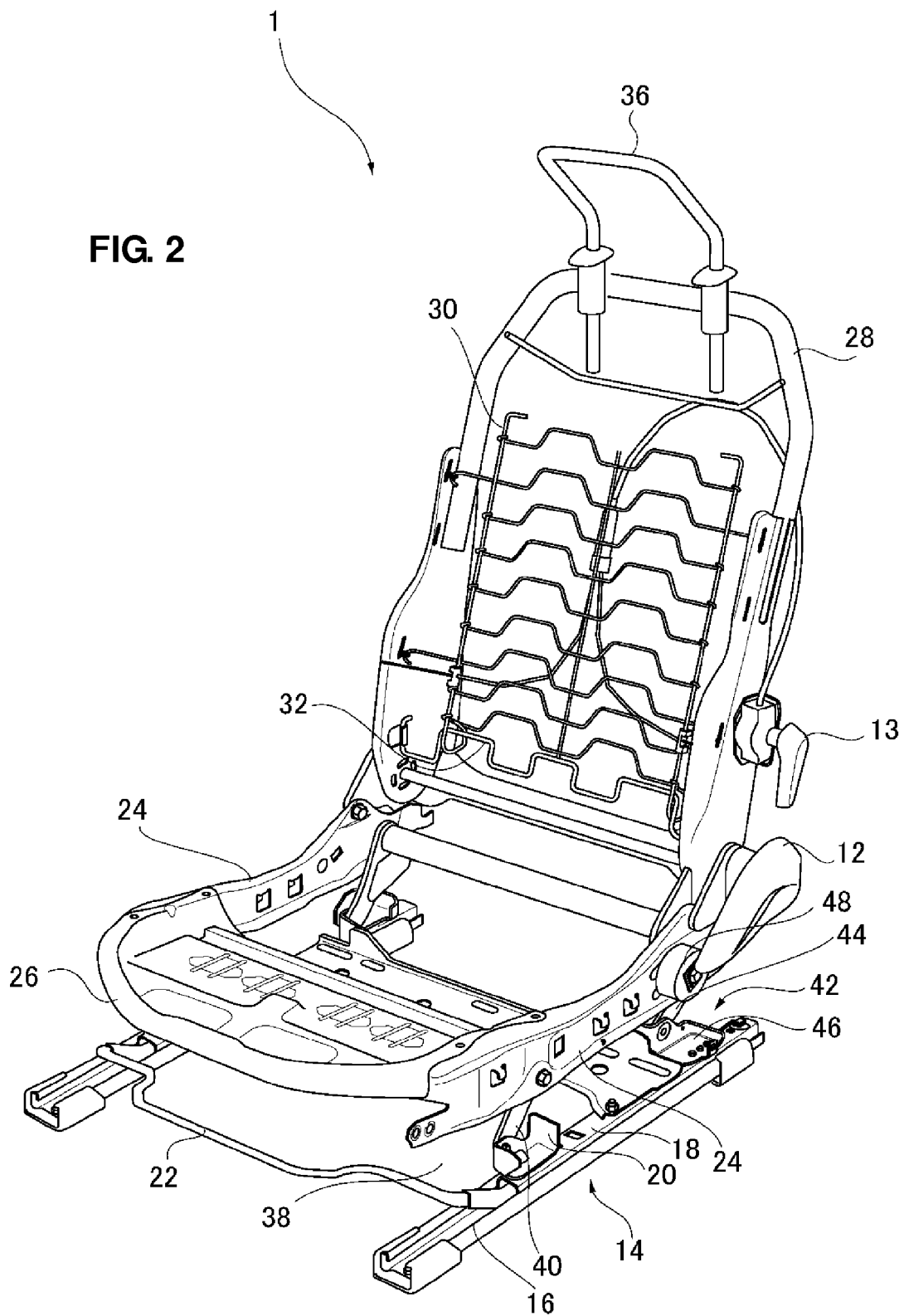
FIG. 2 is a perspective view of the seat structure for a vehicle according to the embodiment of the present invention, when viewed obliquely from the vehicle front-and-left oblique side and the vehicle upper side.
Figure 3:
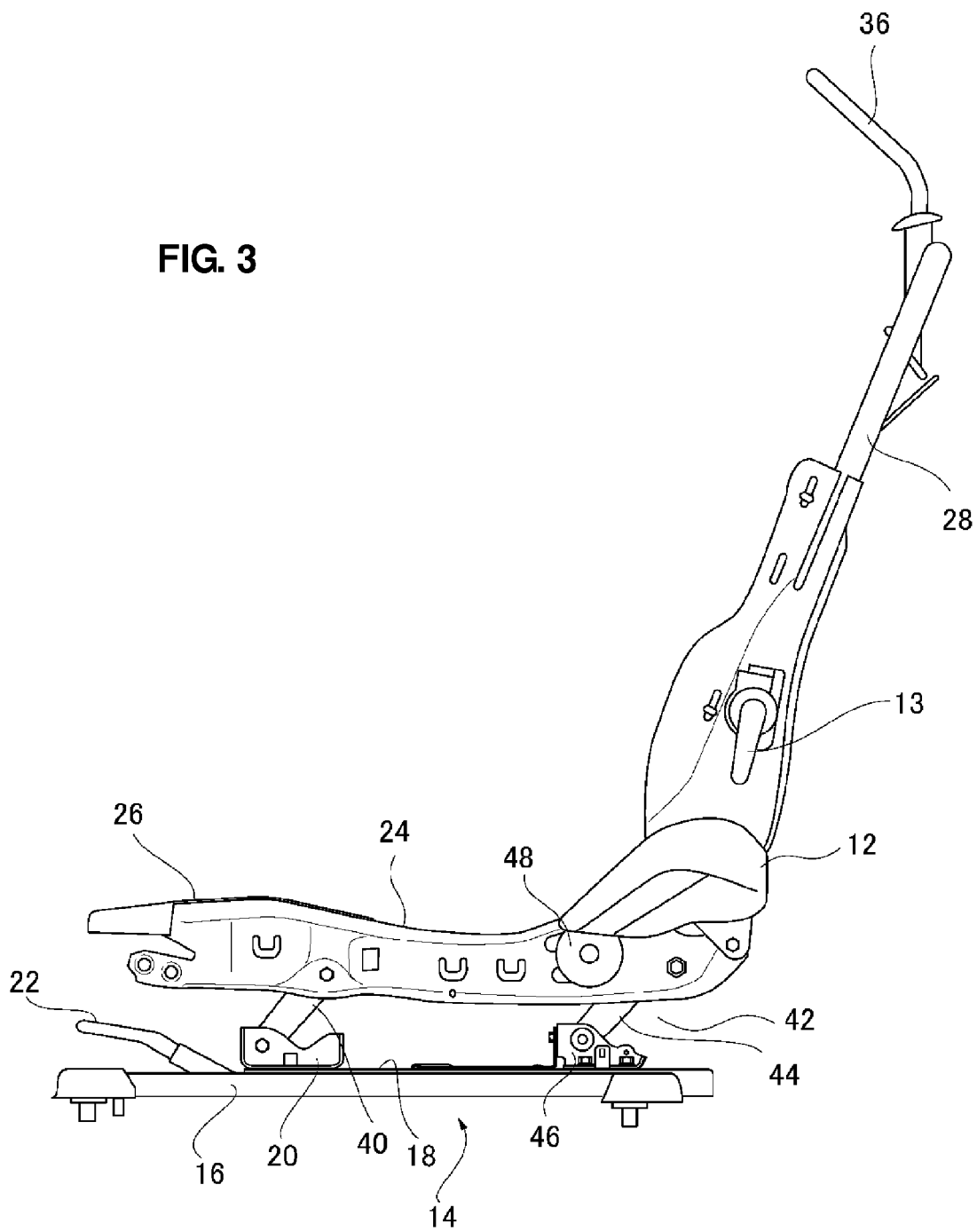
FIG. 3 is a side view of the seat structure for a vehicle according to the embodiment of the present invention, when viewed from a vehicle left side.

Hereinafter, a seat structure for a vehicle according to an embodiment of the present invention will be described referring to the accompanying drawings. First, an entire constitution of the seat structure for a vehicle according to the embodiment of the present invention will be described referring to FIGS. 1-3. FIG. 1 is a perspective view of a seat structure for a vehicle according to an embodiment of the present invention, when viewed obliquely from a vehicle front-and-left oblique side and a vehicle upper side. FIG. 2 is a perspective view of the seat structure for a vehicle according to the embodiment of the present invention, when viewed obliquely from the vehicle front-and-left oblique side and the vehicle upper side. FIG. 3 is a side view of the seat structure for a vehicle according to the embodiment of the present invention, when viewed from a vehicle left side.

As shown in FIG. 1, a seat 1 for a vehicle of the present embodiment includes a seat cushion 2, a seatback 4, and a headrest 6. The seat 1 according to the present embodiment is arranged longitudinally such that its width direction matches a vehicle width direction. A trim member 8 which covers a lower portion of the seat is provided at right-and-left both sides of the seat cushion 2. On the left side of the seat are provided a lift lever 10 to vertically move the seat cushion 2, a reclining lever 12 to recline the seat back 4 by means of a reclining mechanism (not illustrated), and a lumber support lever 13.

Further, as shown in FIGS. 1-3, a pair of slide mechanisms 14 which extend in a vehicle longitudinal direction and support the seat cushion 2 so as to allow the seat cushion 2 to slide in a seat longitudinal direction (the vehicle longitudinal direction) are provided on a vehicle floor (not illustrated) on right and left both sides of the seat 1. Each of the slide mechanisms 14 is mainly comprised of a guide rail 16 fixed to the vehicle floor and a slider 18 provided to engage with and slide along the guide rail 16. A connecting bracket 20 for a front link member 40, a slide-lock releasing lever 22, and others are provided at the slide mechanisms 14, which will be described later.

Moreover, as shown in FIGS. 2 and 3, the seat 1 further includes a pair of right-and-left seat cushion frames 24 supporting the seat cushion 2 and a seat pan 26 fixed to a seat front portion of the seat cushion frame 24 which are arranged inside the seat cushion 2, a seatback frame 28 supporting the seat back 4, a suspension mat 30 and a spring member for supporting 32 which are arranged inside the seatback 4, and a headrest frame 36 to which the headrest 6 is attached and which supports the headrest 6 so that a vertical position of the headrest 6 is adjustable.

The seat 1 of the present embodiment further includes a lifter mechanism 38 which connects the sliders 18 of the slide mechanisms 14 and the seat cushion frame 24 and moves the seat cushion 2 vertically, supporting the seat 1. This lifter mechanism 38, as shown in FIGS. 2 and 3, comprises a pair of right-and-left front link members 40 which are provided at a front portion of the seat and a rear-side link mechanism 42. As shown in FIG. 3, the front link members 40 are pivotally connected to the connecting brackets 20 fixed to the sliders 18 at lower end portions thereof and to the seat cushion frame 24 at upper end portions thereof.

Meanwhile, as shown in FIGS. 2 and 3, the rear-side link mechanism 42 comprises a pair of right-and-left rear link members (connecting members) 44 and connecting brackets (connecting members) 46 which are provided at a rear portion of the seat, respectively. The seat cushion frame 24 is supported by the front link members 40, the rear link members 44, and the connecting brackets 46, and further the seat cushion 2 is configured to be movable vertically by rotation of the respective link members 40, 44.

Figure 4:
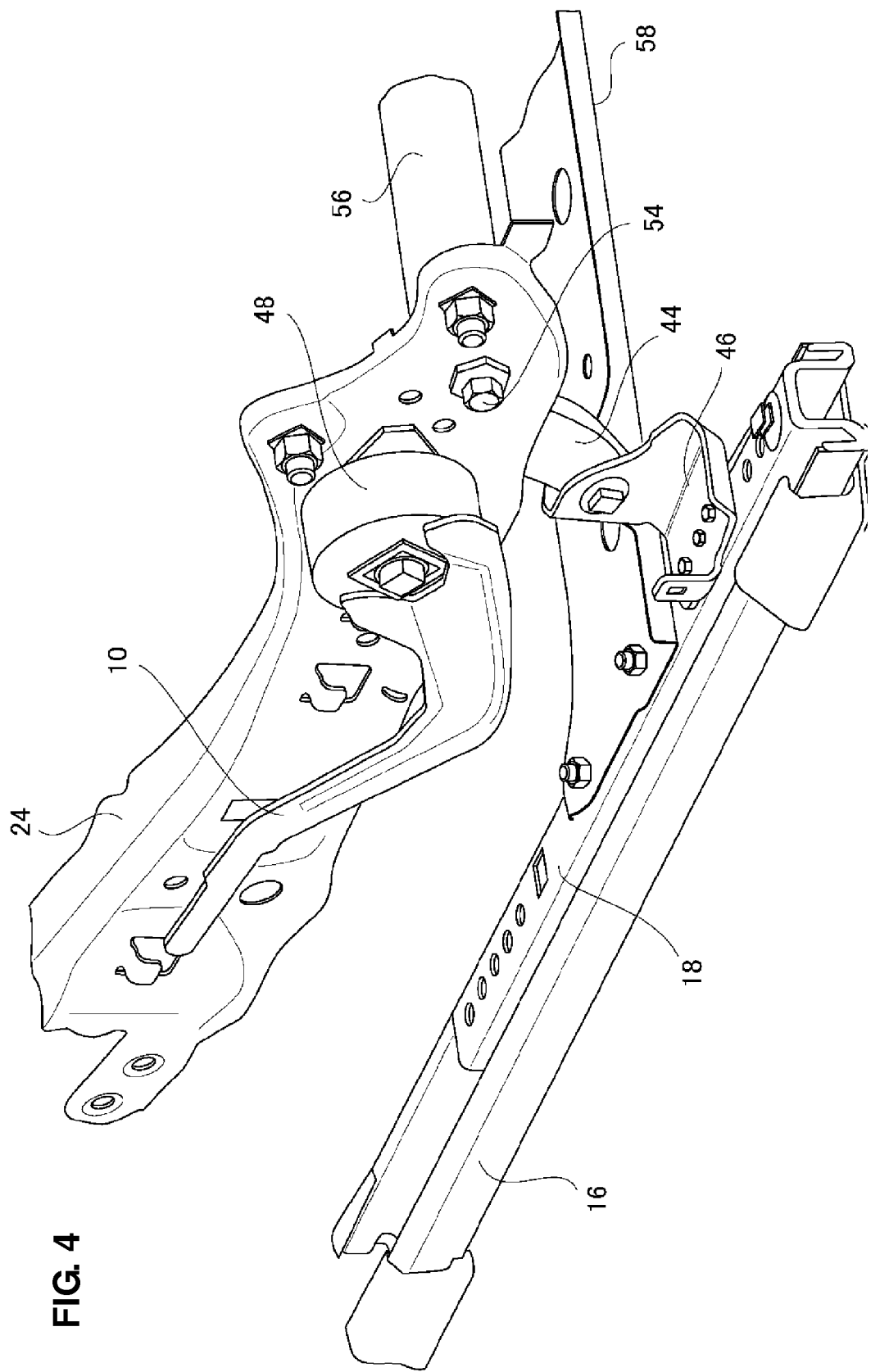
FIG. 4 is a partially-enlarged perspective view of a rear-side link mechanism on the left side of the present embodiment and its surrounding structure, when viewed obliquely from a vehicle rear-and-left oblique side and the vehicle upper side.
Figure 5:
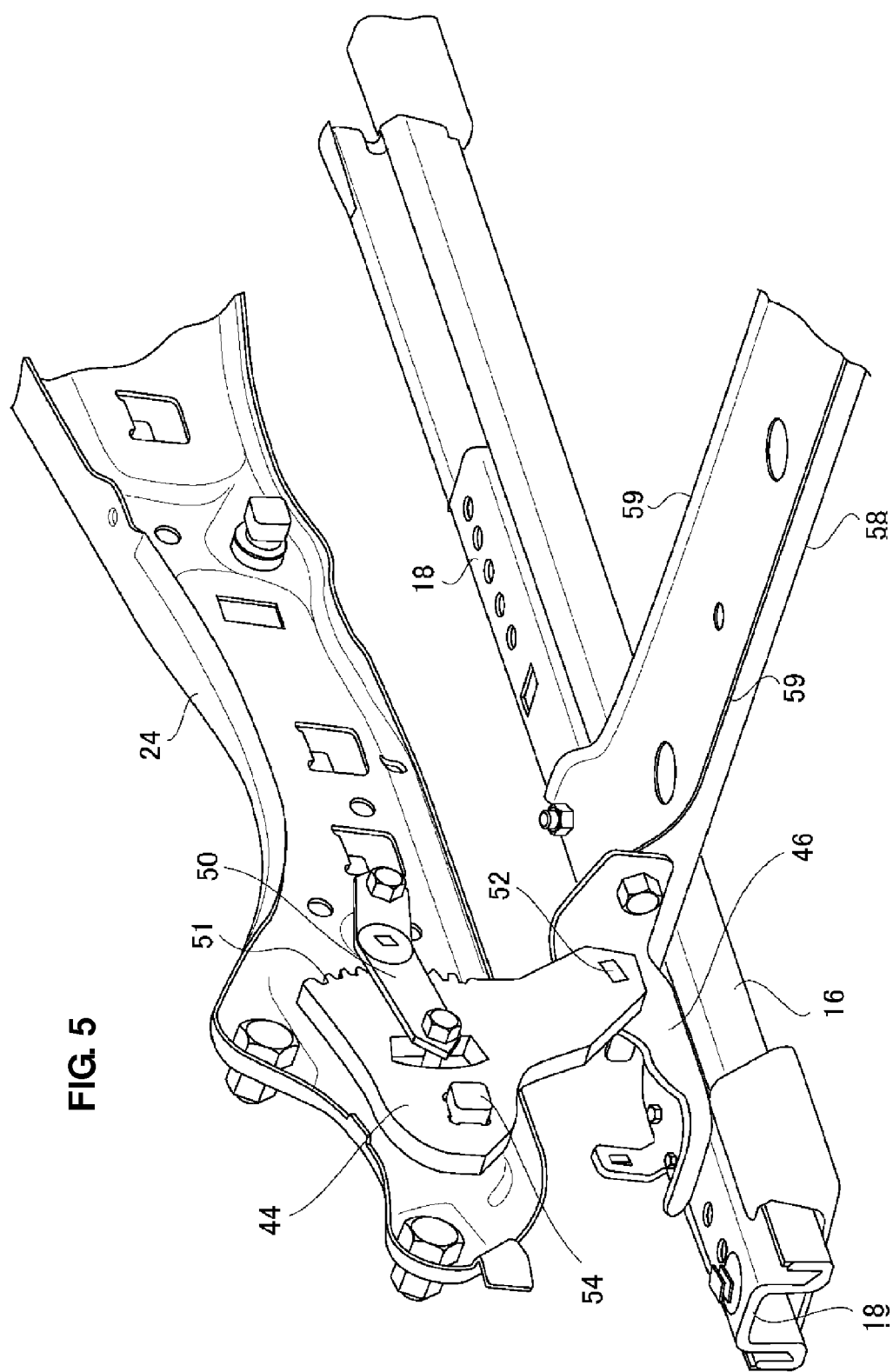
FIG. 5 is a partially-enlarged perspective view of the rear-side link mechanism on the left side of the present embodiment and its surrounding structure, when viewed obliquely from a vehicle rear-and-right oblique side and the vehicle upper side.
Figure 6:
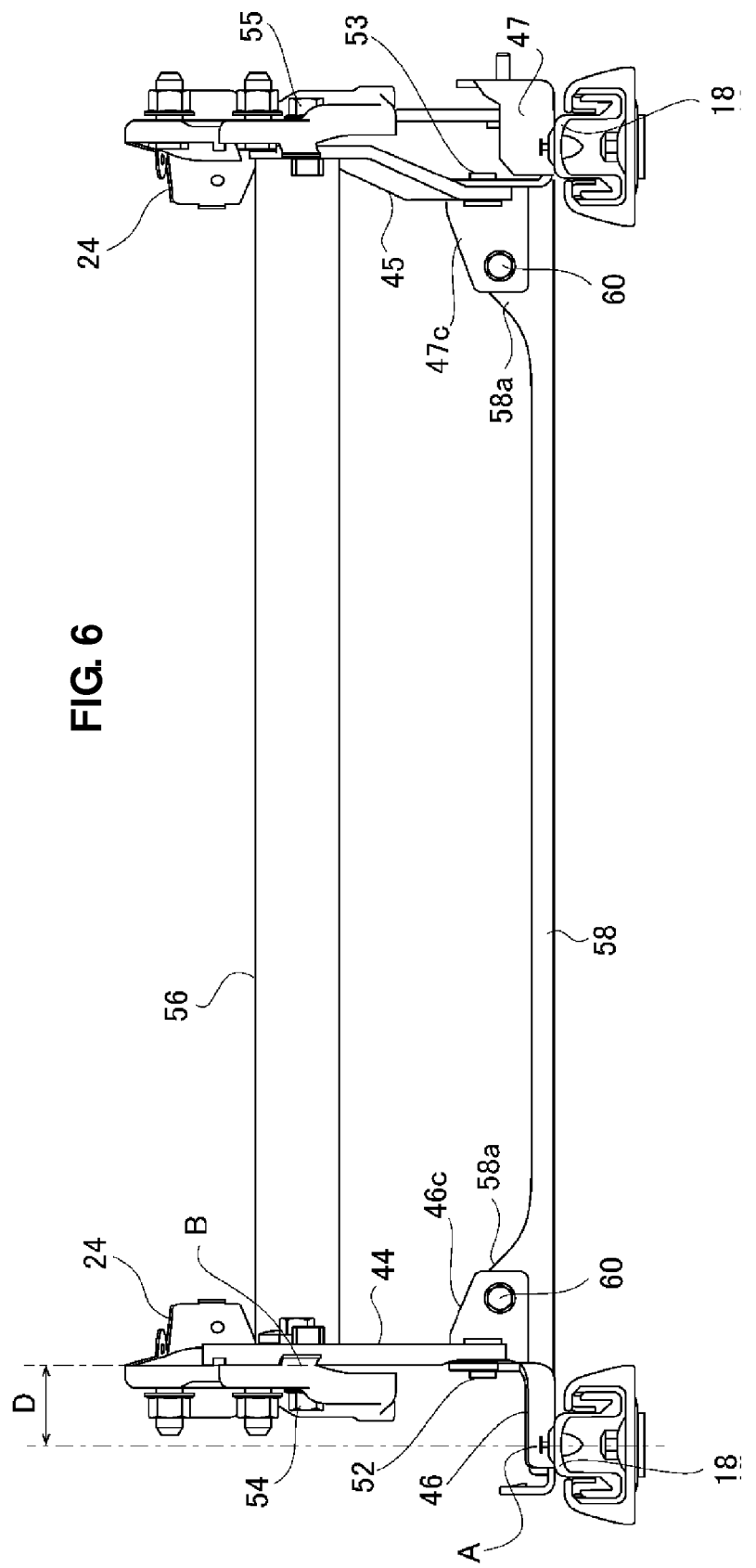
FIG. 6 is a back view of the rear-side link mechanism of the present embodiment and its surrounding structure, when viewed from a vehicle rear side.
Figure 7:
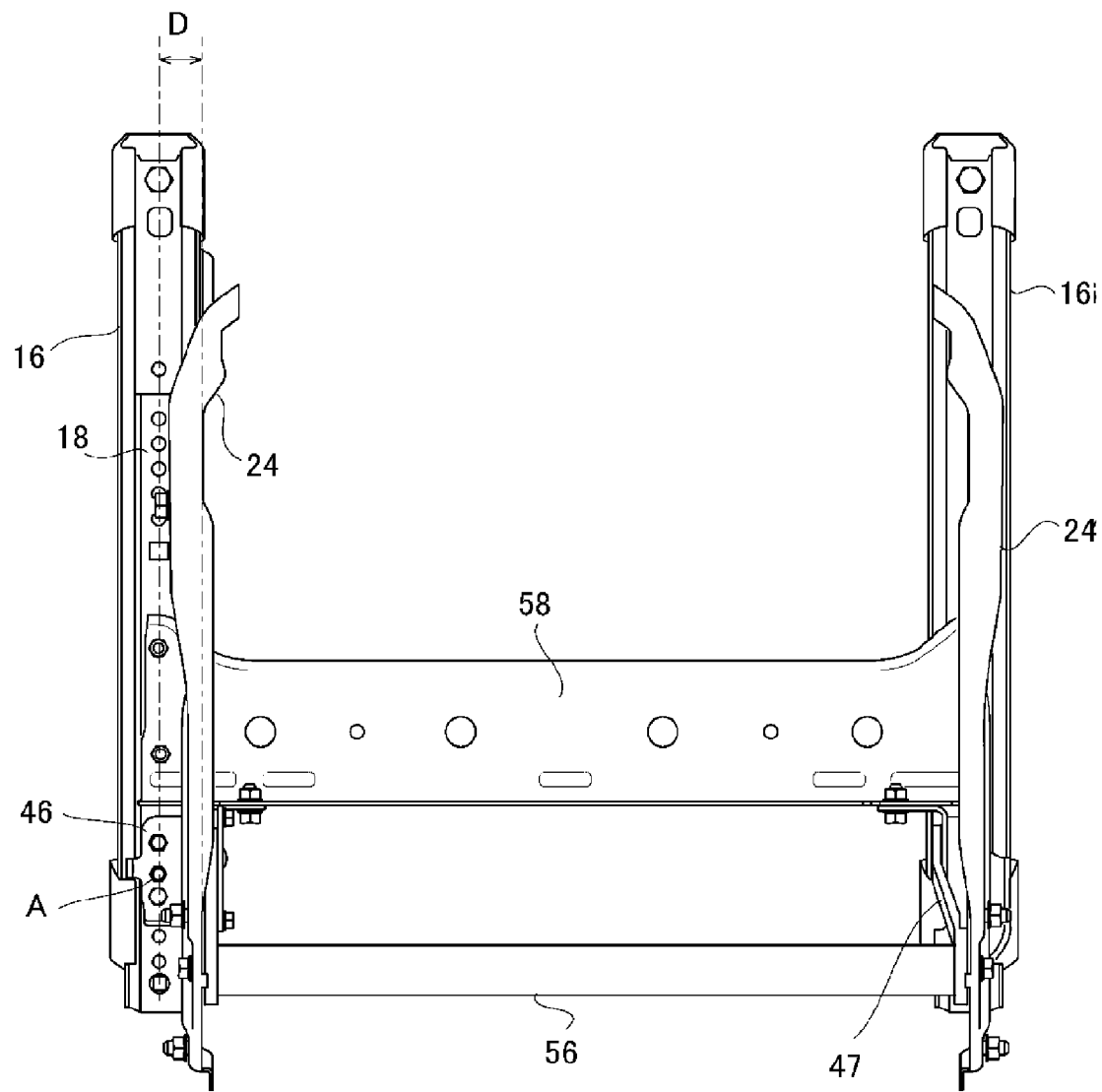
FIG. 7 is a plan view of the rear-side link mechanism of the present embodiment and its surrounding structure, when viewed from the vehicle upper side.

Hereinafter, the rear-side link mechanism 42, and a connection structure of the rear link members 44 to the slide mechanisms 14 and the seat cushion frame 24 will be described referring to FIGS. 4-7. FIG. 4 is a partially-enlarged perspective view of the rear-side link mechanism on the left side of the present embodiment and its surrounding structure, when viewed obliquely from a vehicle rear-and-left oblique side and the vehicle upper side. FIG. 5 is a partially-enlarged perspective view of the rear-side link mechanism on the left side of the present embodiment and its surrounding structure, when viewed obliquely from a vehicle rear-and-right oblique side and the vehicle upper side. An illustration of the stabilizer, which will be described later, is omitted in FIG. 5. FIG. 6 is a back view of the rear-side link mechanism of the present embodiment and its surrounding structure, when viewed from a vehicle rear side. FIG. 7 is a plan view of the rear-side link mechanism of the present embodiment and its surrounding structure, when viewed from the vehicle upper side.

As shown in FIG. 4, the rear-side link mechanism 42 includes a known-art drive unit 48 with gear and latchet which drives and rotates the rear link members 44. The drive unit 48 is configured to move the seat cushion 2 vertically through a driver's operation of the lift lever 10 connected thereto. As shown in FIG. 5, this drive unit 48 includes a link positioning member 50, and the gear (not illustrated) of the drive unit 48 engages with teeth 51 so as to rotate the rear link members 44. Herein, the drive unit 48 may be configured as an electromotive drive unit using a motor or the like.

As shown in FIGS. 4 and 5, a lower rotational axis 52 is formed at a lower portion of the rear link member 44, and an upper rotational axis 54 is provided at an upper portion of the rear link member 44. The lower rotational axis 52 of the rear link member 44 is supported by the connecting bracket 46, which is fixed to the slider 18. A fixation structure of the connecting bracket 46 will be described later. When the drive unit 48 is driven, the rear link member 44 rotates around the lower rotational axis 52, the upper rotational axis 54 rotates accordingly, and consequently the rear link member 44 rotates. The rear link member 44 is configured such that its rotational position is stopped at a specified position by means of a known-art brake mechanism of the drive unit 48. In the present embodiment, the drive unit 48 is provided only at the left side of the seat 1 as shown in FIG. 2.

In the present embodiment, as shown in FIG. 6, the left-side rear link member 44 is substantially a flat-shaped member. Meanwhile, the right-side rear link member 45 includes a flat-shaped portion where a lower rotational axis 53 is provided, an extension portion which extends obliquely outward in a seat with direction from the flat-shaped portion, and another flat-shaped portion which extends upward from the extension portion and where the upper rotational axis 55 is provided.

Further, as shown in FIGS. 4 and 6, a stabilizer 56 which transmits a drive force of the drive unit 48 arranged only on the left side and a holding force by the brake mechanism of the drive unit 48 to the rear link member 45 arranged on the other side (right side) is fixed to a portion of the rear link member 44 where the upper rotational axis 54 is provided. Both end portions of the stabilizer 56 are fixed by welding to respective portions of the rear link members 44, 45 where the upper rotational axes 54, 55 are provided.

Moreover, as shown in FIGS. 4-7, the both-side sliders 18 are coupled to each other by a coupling plate 58. More specifically, as shown in FIGS. 4 and 7 mainly, the coupling plate 58 is a plate extending in the seat width direction (the vehicle width direction), right-and-left both end portions of which are fixed to the sliders 18 by bolts at two points each. Thereby, respective sliding, in the longitudinal direction, of the right and left sliders 18 are configured to be synchronous with each other. The coupling plate 58 has a specified length in the seat longitudinal direction (the vehicle longitudinal direction) so as to provide a large rigidity enough to ensure the above-described synchronized sliding of the sliders.

Figure 8:
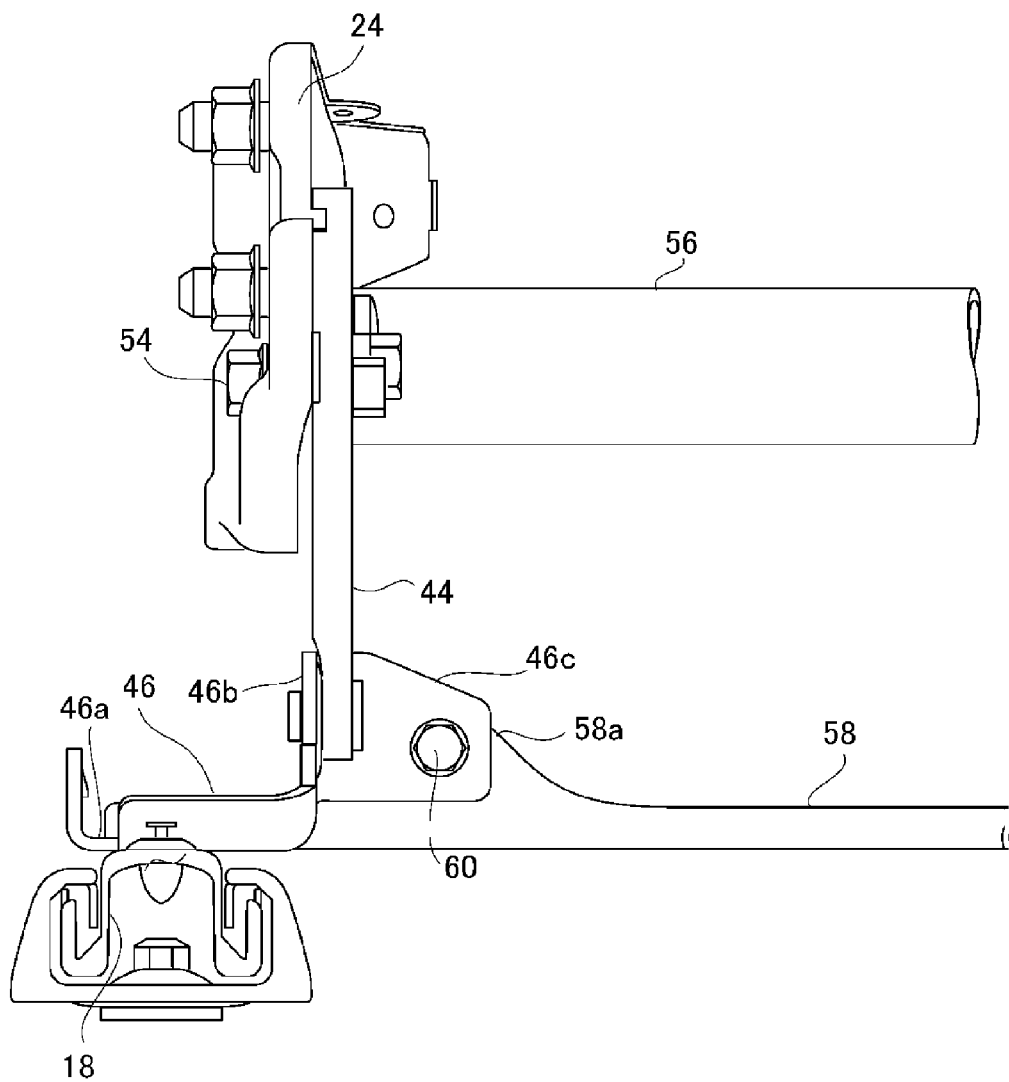
FIG. 8 is a partially-enlarged back view of a rear-side link mechanism on the left side of the present embodiment and its surrounding structure, when viewed from the vehicle rear side.
Figure 9:
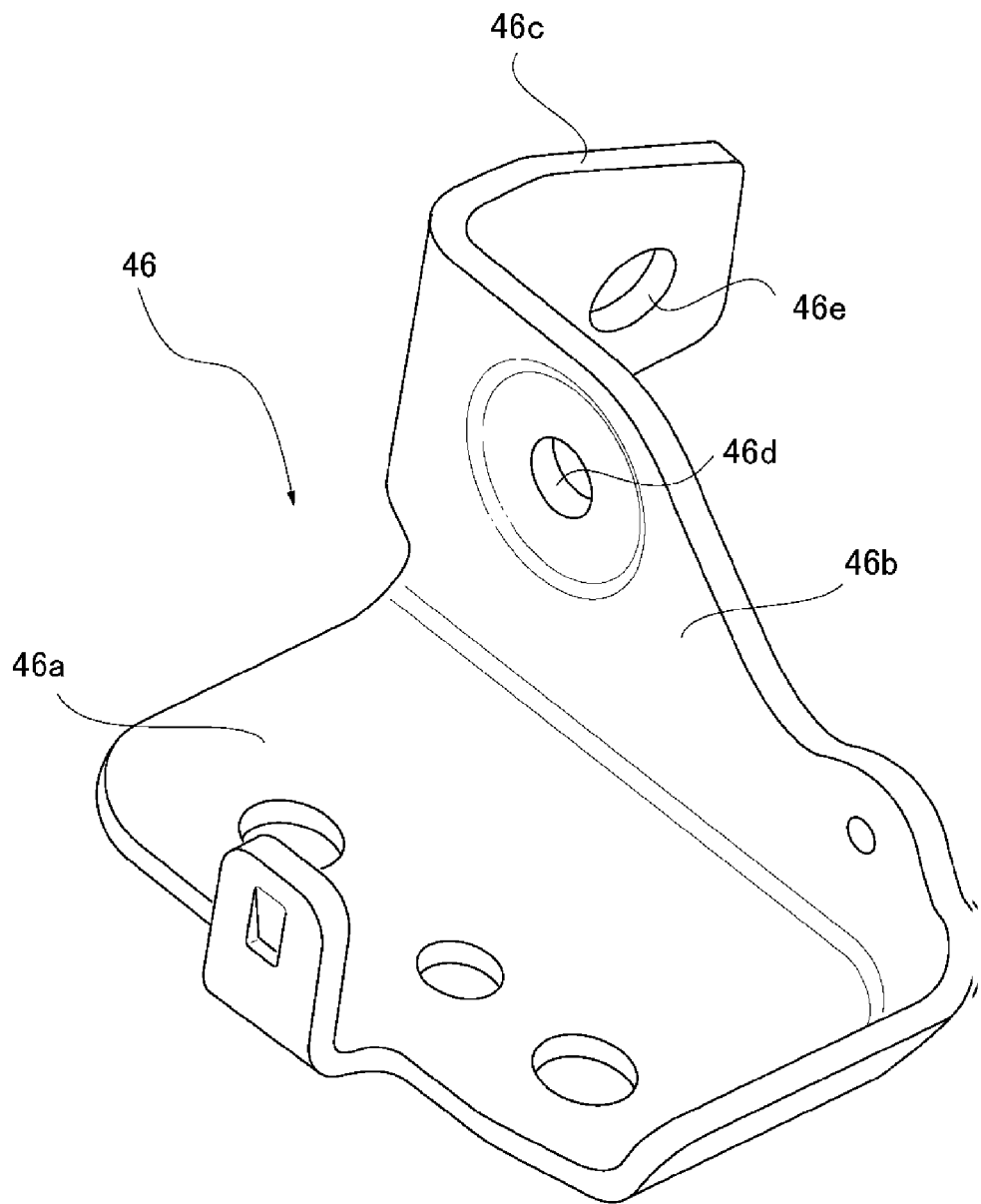
FIG. 9 is a perspective view showing a connecting bracket fixed to a slider of the present embodiment.
Figure 10A:
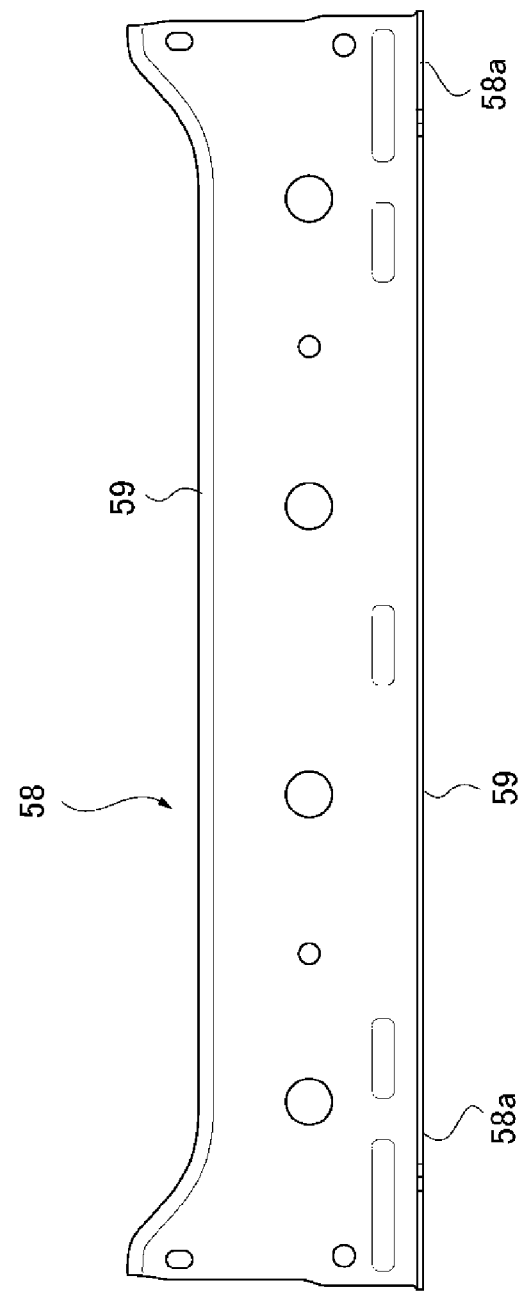
FIGS. 10A, 10B and 10C are views of a coupling plate of the present embodiment.
Figure 10B:
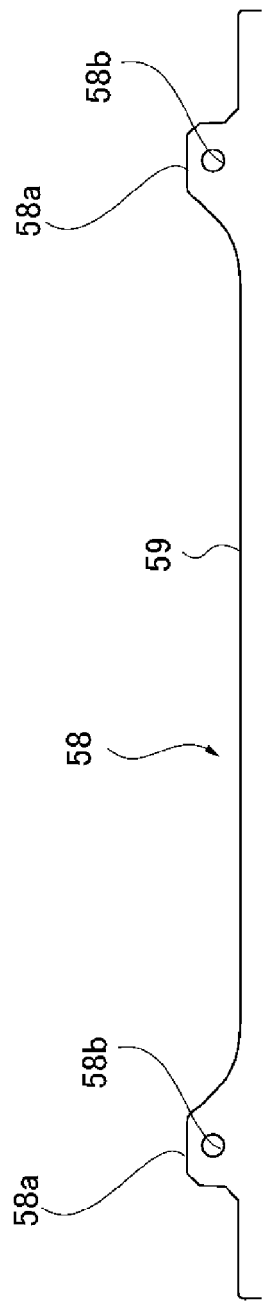
Figure 10C:
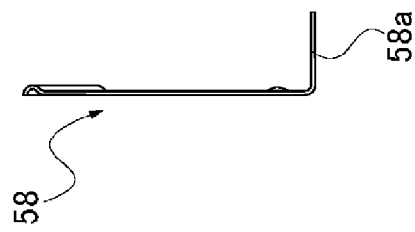

Next, a connection structure of the rear link members 44, 45 and the connecting brackets 46, 47 and a connection structure of the coupling plate 58 and the connecting brackets 46, 47 will be described referring to FIGS. 8-10A, B and C. FIG. 8 is a partially-enlarged back view of the rear-side link mechanism on the left side of the present embodiment and its surrounding structure, when viewed from the vehicle rear side. FIG. 9 is a perspective view showing the connecting bracket fixed to the slider of the present embodiment. FIGS. 10A, 10B and 10C are views of the coupling plate of the present embodiment: FIG. 10A is a plan view; FIG. 10B is a back view; and FIG. 10C is a side view.

First, the connection structure of the rear link members 44, 45 and the connecting brackets 46, 47 will be described. As shown in FIGS. 8 and 9, the connecting bracket (connecting member) 46 has a first face 46a, which is fixed to the slider 18 by calking. Further, the connecting bracket 46 has a second face 46b, to which the above-described lower rotational axis 52 of the rear link member 44 is connected. That is, as shown in FIG. 9, a hole 46b for pivotally supporting the lower rotational axis 52 is formed at the second face 46b of the connecting bracket 46. The second face 46b is formed in a flat shape so as to guide the rotation of the rear link member 44.

Moreover, the connecting bracket 46 has a third face 46c, which is fixed, by a bolt 60 (see FIG. 8) and a nut (not illustrated), to a flange face 58a (see FIG. 10A, B, C) which is formed at a rear-side edge portion of the above-described coupling plate (coupling member) 58 and extends upward, which will be described specifically later. Also, the third face 46c and the flange face 58a are fixed to each other by the bolt 60 and the nut such that respective faces thereof contact each other. The other-side (right-side) connecting bracket 47 is configured similarly to the above-described connecting bracket 46.

Herein, in the present embodiment, as shown in FIGS. 6 and 7, according to the above-described shape and constitution of the connecting bracket 46 and the rear link member 44 for mutually connecting the slider 18 and the seat cushion frame 24, a connection position (illustrated by B in the figures) of the left-side rear link member (connecting member) 44 and the seat cushion frame 24 is located inward in the seat width direction relative to a connection position (illustrated by A in the figures) of the connecting bracket 46 and the slider 18. In other words, in the back view (FIG. 6) and the plan view (FIG. 7) (likewise, in the elevational view), the connection position B is offset inward in the seat width direction from the connection position A by a specified distance D. According to the above-described structure of the present embodiment, the connecting bracket 46 as part of the connection members and the above-described coupling plate 58 are fixed to each other, so that the rigidity is increased so as to restrain the left-side connecting members 44, 46 from falling down (moving) toward the right-side connecting members 45, 47 in the vehicle rear-end collision.

The thickness of the coupling plate 58 is set at a specified thickness capable of providing a sufficient rigidity against the load acing downward and rearward as well as an appropriate light-weight structure. In the present embodiment, the thickness is about 1 mm, and flange and rib 59 (see FIGS. 5 and 10A, B, C) are formed at the coupling plate 58 so as to provide the high bending rigidity and the light weight.

Next, the connection structure of the coupling plate 58 and the connecting brackets 46, 47 will be described. As shown in FIGS. 10A-10C, the rear-side edge portion of the coupling plate 58 has the flange faces 58a bending upward at both ends thereof, and a bolt hole 58b for the bolt 60 (see FIG. 8) inserted thereinto is formed at each of the flange faces 58a. As shown in FIG. 8 mainly, the third face 46c of the connecting bracket 46 contacts each of the flange faces 58a as described above, and the both faces 46c, 58a are fixed together by fastening the bolt 60. Further, as shown in FIG. 6, the third face 47c of the right-side connecting bracket 47 and the flange face 58a are fixed together similarly.

Herein, while the third face 46c of the connecting bracket 46 according to the present embodiment shown in FIG. 8 is fixed together so as to be arranged in back of the flange face 58a of the connecting plate 58, the third face 46c of the connecting bracket 46 may be arranged in front of the flange face 58a of the connecting plate 58 and fixed together alternatively. Also, the flange face 58a of the connecting plate 58 may be formed at a front-side edge portion of the coupling plate 58.

Herein, the flange face 58a of the coupling plate 58 and the third face 46c of the connecting bracket 46 are arranged and formed such that they extend in a direction perpendicular to the vehicle longitudinal direction when the seat 1 is placed on the vehicle floor. Likewise, the coupling plate 58 is provided to extend in the vehicle width direction when the seat 1 is provided at the vehicle body.

The present embodiment is applicable to a seat structure in which the connecting members 44, 46 and the connecting members 45, 47 on the both sides are respectively located at the above-descried offset position, in the seat width direction, of the connection positions A, B.

Further, the present embodiment is also applicable to a seat in which the level (height position) of its seat cushion is fixed at a specified height position. For example, there may be provided a seat in which the link mechanism and the drive unit are removed, a pair of brackets for seat supporting which are constituted by expanding the above-described pair of connecting brackets (46, 47) are used, and the connection position (B) of at least one of the pair of brackets and the seat cushion frame (24) is located inward in the seat width direction relative to the connection position (A) of the at least one of the pair of brackets and at least one of the pair of sliders (18).

Next, the operation and effects of the seat structure of the present embodiment of the present invention will be described. First, according to the present embodiment, the seat structure for a vehicle comprises the slide mechanisms 14 including the pair of guide rails 16 provided at the vehicle floor and the pair of sliders 18, the pair of connecting members 44, 45, 46, 47 connecting the pair of sliders 18 of the slide mechanisms 14 and the seat cushion frame 24, the connection position B of the connecting members 44, 46 (one of the pair of connecting members 44-47) and the seat cushion frame 24 being located inward in the seat width direction relative to the connection position A of the connecting members 44, 46 and one of the pair of sliders 18, and the coupling plate (coupling member) 58 coupling the pair of connecting members 44-47 in the seat width direction (vehicle width direction) so as to restrain the connecting members 44, 46 from moving toward the other connecting members 45, 47 in the rear-end collision of the vehicle. Accordingly, the connecting members 44, 46 can be restrained from falling down toward a space which is formed between the both-side slide mechanisms 14 and below the seat cushion 2 (i.e., toward the inside of the pair of slide mechanisms 14) in the vehicle rear-end collision, whereby lowering of a rear portion of the seat portion, on which a relatively large load acts, can be restrained. Consequently, vertical and relative positions of a passenger's head relative to the headrest 6 can be kept properly.

That is, when the rear-end collision occurs, a load acts on the connecting members 44-47 rearward and downward because of a moment force caused of a load acting on the seatback. Herein, according to the above-described embodiment having the inward-offset structure (with the specified distance D), there is a concern that the connecting bracket 46 and the rear link member 44 may fall down toward the inside of the both right-and-left slide mechanisms 14. However, the coupling plate 58 and the connecting brackets 46, 47 are fixed together to increase the rigidity so that the left-side connecting members 44, 46 can be restrained from moving toward the right-side connecting members 45, 47. Therefore, even if the above-described load acts rearward and downward in the rear-end collision, the downward lowering of the seat rear portion can be restrained so that the vertical position of the passenger's head relative to the headrest can be kept properly. In a case in which the right-side connecting members 45, 47 are arranged with the inward-offset structure as well, the both-side pair of connecting members 44-47 can be restrained from falling down inward.

Also, according to the present embodiment, since the coupling member 58 is fixed to the faces 46c, 47c extending in the direction perpendicular to the vehicle longitudinal direction of the pair of connecting members 44-47, the inward falling down of the connecting members 44, 46 can be restrained effectively. In the case in which the right-side connecting members 45, 47 are arranged with the inward-offset structure as well, the both-side pair of connecting members 44-47 can be restrained from falling down inward more effectively.

Further, according to the present embodiment, since the faces 46c, 47c extending in the direction perpendicular to the vehicle longitudinal direction of the pair of connecting members 44-47 and the faces 58a extending in the direction perpendicular to the vehicle longitudinal direction of the coupling member 58 are fixed by the bolts (or calking), the fixation direction of the faces 46c, 47c of the connecting members 44-47 and the faces 58a of the coupling member 58 is perpendicular to the inward-falling-down direction of the connecting members 44, 46, so that the inward falling down of the connecting members 44, 46 can be restrained effectively. That is, when the inward falling down may occur, a shearing force may act on a portion between the faces 46c, 47c and the faces 58a. However, since these faces extending in the direction perpendicular to the vehicle longitudinal direction are fixed by the bolts (or calking) according to the present embodiment, the present embodiment is effectively resistant against such a sheering force. This is the same in the case in which the right-side connecting members 45, 47 are arranged with the inward-offset structure as well.

Moreover, according to the present embodiment, since the plate member 58 as the coupling member couples the pair of sliders 18, and the rear edge portion (or their front edge portions) of the plate member 58 which is configured to bend upward is fixed to the pair of connecting brackets 46, 47, the inward falling down of the pair connecting brackets 46, 47 and the rear link members 44 connected to the bracket 46 can be restrained with a simple structure, ensuring the positing of the slide of the seat 1 which is achieved by synchronizing of the slide of the pair of sliders 18. This is the same in the case in which the right-side connecting members 45, 47 are arranged with the inward-offset structure as well.

Additionally, according to the present embodiment, since the seat structure further comprises the drive unit 48 provided to drive the link member 44 (one of the pair of link members 44, 45) so as to have the seat cushion frame 24 move vertically and the stabilizer 56 interconnecting the pair of link members 44, 45 so as to drive the other link member 45 synchronously with the link member 44 driven by the drive unit 48, the number of parts can be reduced by providing the drive unit 48 only for one of the pair of link members 44, 45. Further, since the positions where both end portions of the stabilizer 56 are fixed to the pair of link members 44, 45 are located inward in the seat width direction relative to the connection positions A of the pair of connecting members 46, 47 and the pair of sliders 18, the length of the stabilizer 56 can be properly short because of the inward-offset location, thereby achieving light weight. Moreover, since the both end portions of the stabilizer 56 are fixed to the pair of link members 44, 45, the inward falling down of the rear link member 44 (45) can be restrained surely, in addition to the restraint function of the inward falling down of the connecting members 44, 46 (45, 47) which is achieved by the coupling member 58.

The present invention should not be limited to the above-described embodiment, and any other modifications or improvements may be applied within the scope of a spirit of the present invention.

What is claimed is:

1. A seat structure for a vehicle which comprises a seat cushion, a seatback, and a headrest, comprising:
   a seat cushion frame provided inside the seat cushion;
   a pair of right-and-left slide mechanisms provided at right and left both-side portions of the seat cushion in a plan view so as to support the seat cushion frame slidably in a seat longitudinal direction, the slide mechanisms including a pair of guide rails provided at a floor of the vehicle and a pair of sliders provided to engage with and slide along the pair of guide rails;
   a pair of right-and-left connecting members connecting the pair of sliders of the slide mechanisms and the seat cushion frame so as to support the seat cushion frame, a connection position of at least one of the pair of connecting members and the seat cushion frame being located inward in a seat width direction relative to a connection position of the at least one of the pair of connecting members and at least one of the pair of sliders, each of the pair of connecting members including a link member and a connecting bracket, the link member being connected to the seat cushion frame at an upper portion thereof and configured to be rotated according to an operation of a drive unit, the connecting bracket pivotally supporting a lower portion of the link member and being fixed by a first fixation means to the slider of the slide mechanism which is separately formed from the connecting bracket,
   a coupling member coupling the pair of connecting brackets of the pair of connecting members in a vehicle width direction, the coupling member being further fixed by a second fixation means to the pair of sliders at right and left both-side end portions thereof,
   wherein a connection position of the link member of at least one of said pair of connecting members and said seat cushion frame is located inward in the seat width direction relative to a connection position of the connecting bracket and said slider,
   the connecting bracket of each of said pair of connecting members includes a slider fixation portion which is fixed to said slider by the first fixation means, a link-member support portion which pivotally supports the lower portion of said link member, and a coupling-member fixation portion which is fixed to said coupling member by a third fixation means,
   said coupling member includes, at each of right and left both-side ends thereof, a slider fixation portion which is fixed to said slider by the second fixation means and a connecting-bracket fixation portion which is fixed to said coupling-member fixation portion of the connecting bracket by the third fixation means, and
   a fixation position for fixing the connecting bracket and the coupling member with the third fixation means is located at a higher level than a fixation position for fixing the connecting bracket and the slider with the first fixation means so as to restrain the connecting bracket from moving inward in the seat width direction in a rear-end collision of the vehicle.

2. The seat structure for a vehicle of claim 1, wherein each of said pair of connecting brackets has a face which extends in a direction perpendicular to a vehicle longitudinal direction, and said coupling-member fixation portion of the connecting bracket is formed at said face.

3. The seat structure for a vehicle of claim 2, wherein said coupling member has a face which extends in the direction perpendicular to the vehicle longitudinal direction, and said connecting-bracket fixation portion of the coupling member is formed at said face of the coupling member.

4. The seat structure for a vehicle of claim 1, wherein said coupling member, which has a specified length in the seat longitudinal direction and extends in a vehicle width direction, is a plate member which couples said pair of sliders of the slide mechanisms, a front edge portion or a rear edge portion of said plate member is configured to bend upward, and said connecting-bracket fixation portion of the coupling member is formed at said edge portion configured to bend upward.

5. The seat structure for a vehicle of claim 1, wherein said drive unit is provided at either one of right and left sides of the seat to drive one of said pair of link members so as to have the seat cushion frame move vertically and there is provided a stabilizer interconnecting said pair of link members so as to drive the other of the link members synchronously with said one of the link members which is driven by the drive unit, positions where both end portions of said stabilizer are fixed to said pair of link members being located inward in the seat width direction relative to said connection positions of the pair of connecting brackets and the pair of sliders.

6. The seat structure for a vehicle of claim 2, wherein said drive unit is provided at either one of right and left sides of the seat to drive one of said pair of link members so as to have the seat cushion frame move vertically and there is provided a stabilizer interconnecting said pair of link members so as to drive the other of the link members synchronously with said one of the link members which is driven by the drive unit, positions where both end portions of said stabilizer are fixed to said pair of link members being located inward in the seat width direction relative to said connection positions of the pair of connecting brackets and the pair of sliders.

7. The seat structure for a vehicle of claim 3, wherein said drive unit is provided at either one of right and left sides of the seat to drive one of said pair of link members so as to have the seat cushion frame move vertically and there is provided a stabilizer interconnecting said pair of link members so as to drive the other of the link members synchronously with said one of the link members which is driven by the drive unit, positions where both end portions of said stabilizer are fixed to said pair of link members being located inward in the seat width direction relative to said connection positions of the pair of connecting brackets and the pair of sliders.

8. The seat structure for a vehicle of claim 4, wherein said drive unit is provided at either one of right and left sides of the seat to drive one of said pair of link members so as to have the seat cushion frame move vertically and there is provided a stabilizer interconnecting said pair of link members so as to drive the other of the link members synchronously with said one of the link members which is driven by the drive unit, positions where both end portions of said stabilizer are fixed to said pair of link members being located inward in the seat width direction relative to said connection positions of the pair of connecting brackets and the pair of sliders.

9. The seat structure for a vehicle of claim 1, wherein a support position for supporting the lower portion of said link member at said connecting bracket is located inward, in the seat width direction, relative to said fixation position for fixing the connecting bracket and the slider with the first fixation means, and said fixation position for fixing the connecting bracket and the coupling member with the third fixation means is located inward, in the seat width direction, relative to said support position for supporting the lower portion of the link member at the connecting bracket.

10. The seat structure for a vehicle of claim 1, wherein a support position for supporting the lower portion of said link member at said connecting bracket is located at a higher level than said fixation position for fixing the connecting bracket and the slider with the first fixation means, which is located substantially the same level as said fixation position for fixing the connecting bracket and the coupling member with the third fixation means.

\* \* \* \* \*